US007376964B1

(12) United States Patent
Kim

(10) Patent No.: US 7,376,964 B1
(45) Date of Patent: May 20, 2008

(54) MASTER GUIDE TABLE FOR A DIGITAL BROADCAST PROTOCOL AND METHOD OF BROADCASTING AND RECEIVING BROADCAST SIGNALS USING THE TABLE

(75) Inventor: Jin Pil Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 1016 days.

(21) Appl. No.: 09/691,054

(22) Filed: Oct. 19, 2000

(30) Foreign Application Priority Data

Oct. 19, 1999 (KR) ............................... 1999-45327

(51) Int. Cl.
G06F 3/00 (2006.01)
G06F 13/00 (2006.01)
H04N 5/445 (2006.01)

(52) U.S. Cl. ......................... 725/50; 725/39; 725/38; 725/37

(58) Field of Classification Search .................. 725/50, 725/54, 39
See application file for complete search history.

(56) References Cited

U.S. PATENT DOCUMENTS 5,917,481 A 6/1999 Rzeszewski et al.

FOREIGN PATENT DOCUMENTS

JP 10224751 8/1998
TW 358311 5/1999

OTHER PUBLICATIONS

Microsoft Press, Computer Dictionary, 3rd edition, p. 198.*

"ATSC Standard: Program and System Information Protocol for Terrestrial Broadcast and Cable (Revision B)," Advanced Television Systems Committee, Doc. A/65B, Mar. 18, 2003.

"ATSC Standard: Program and System Information Protocol for Terrestrial Broadcast and Cable," Advanced Television Systems Committee, Doc. A/65, Dec. 23, 1997.

* cited by examiner

*Primary Examiner*—Chris Kelley
*Assistant Examiner*—Usha Raman
(74) *Attorney, Agent, or Firm*—McKenna Long & Aldridge LLP

(57) ABSTRACT

A master guide table for a digital broadcast protocol, and a method of broadcasting and updating an electronic program guide using the table, uses identification information included in a bit stream syntax of the master guide table to classify whether contents of an event information table are merely shifted in time, or are actually changed. The master guide table is transmitted in accordance with a program and system information protocol (PSIP) for an advanced television system committee (ATSC) defined standard digital television broadcast protocol. A digital television receiver of a receiving party, or a digital cable broadcast receiver, can determine whether the contents of the event information table EIT are merely shifted in time or actually changed by parsing the identification information in the master guide table MGT. If the parsed contents of the identification information indicate that the event information table contents are merely shifted in time without any change, then a database maintaining previous event information table is not updated. Accordingly, time wasted in unnecessarily updating the database can be decreased.

16 Claims, 3 Drawing Sheets

| | No. of bits | Mnemonic |
|---|---|---|
| master_guide_table_section(){ | | |
| table_id | 8 | 0xC7 |
| section_syntax_indicator | 1 | '1' |
| private_indicator | 1 | '1' |
| reserved | 2 | '11' |
| section_indicator | 12 | uimsbf |
| table_id_extension | 16 | 0x0000 |
| reserved | 2 | '11' |
| version_number | 5 | uimsbf |
| current_next_indicator | 1 | '1' |
| section_number | 8 | 0x00 |
| last_section_number | 8 | 0x00 |
| protocol_version | 8 | uimsbf |
| tables_defined | 16 | uimsbf |
| for(i=0; i<tables_defined; i++){ | | |
| table_type | 16 | uimsbf |
| reserved | 3 | '111' |
| table_type_PID | 13 | uimsbf |
| reserved | 2 | '11' |
| EIT_shifted | 1 | uimsbf |
| table_type_version_number | 5 | uimsbf |
| number_bytes | 32 | uimsbf |
| reserved | 4 | '1111' |
| table_type_descriptor_length | 12 | uimsbf |
| for(k=0; k<N; k++) | | |
| descriptor() | var | |
| } | | |
| reserved | 4 | '1111' |
| descriptor_length | 12 | uimsbf |
| for(l=0; l<N; l++) | | |
| descriptor() | var | '1111' |
| CRC_32 | 32 | rpchof |
| } | | |

FIG. 1
Backgroud Art

| | No. of bits | Mnemonic |
|---|---|---|
| master_guide_table_section(){ | | |
|     table_id | 8 | 0xC7 |
|     section_syntax_indicator | 1 | '1' |
|     private_indicator | 1 | '1' |
|     reserved | 2 | '11' |
|     section_indicator | 12 | uimsbf |
|     table_id_extension | 16 | 0x0000 |
|     reserved | 2 | '11' |
|     version_number | 5 | uimsbf |
|     current_next_indicator | 1 | '1' |
|     section_number | 8 | 0x00 |
|     last_section_number | 8 | 0x00 |
|     protocol_version | 8 | uimsbf |
|     tables_defined | 16 | uimsbf |
|     for(i=0; i<tables_defined; i++){ | | |
|         table_type | 16 | uimsbf |
|         reserved | 3 | '111' |
|         table_type_PID | 13 | uimsbf |
|         reserved | 3 | '111' |
|         table_type_version_number | 5 | uimsbf |
|         number_bytes | 32 | uimsbf |
|         reserved | 4 | '1111' |
|         table_type_descriptor_length | 12 | uimsbf |
|         for(k=0; k<N; k++) | | |
|             descriptor() | var | |
|     } | | |
|     reserved | 4 | '1111' |
|     descriptor_length | 12 | uimsbf |
|     for(l=0; l<N; l++) | | |
|         descriptor() | var | '1111' |
|     CRC_32 | 32 | rpchof |
| } | | |

Backgroud Art

FIG.3

| | No. of bits | Mnemonic |
|---|---|---|
| master_guide_table_section(){ | | |
|   table_id | 8 | 0xC7 |
|   section_syntax_indicator | 1 | '1' |
|   private_indicator | 1 | '1' |
|   reserved | 2 | '11' |
|   section_indicator | 12 | uimsbf |
|   table_id_extension | 16 | 0x0000 |
|   reserved | 2 | '11' |
|   version_number | 5 | uimsbf |
|   current_next_indicator | 1 | '1' |
|   section_number | 8 | 0x00 |
|   last_section_number | 8 | 0x00 |
|   protocol_version | 8 | uimsbf |
|   tables_defined | 16 | uimsbf |
|   for(i=0; i<tables_defined; i++){ | | |
|     table_type | 16 | uimsbf |
|     reserved | 3 | '111' |
|     table_type_PID | 13 | uimsbf |
|     reserved | 2 | '11' |
|     EIT_shifted | 1 | uimsbf |
|     table_type_version_number | 5 | uimsbf |
|     number_bytes | 32 | uimsbf |
|     reserved | 4 | '1111' |
|     table_type_descriptor_length | 12 | uimsbf |
|     for(k=0; k<N; k++) | | |
|       descriptor() | var | |
|   } | | |
|   reserved | 4 | '1111' |
|   descriptor_length | 12 | uimsbf |
|   for(l=0; l<N; l++) | | |
|     descriptor() | var | '1111' |
|   CRC_32 | 32 | rpchof |
| } | | |

MASTER GUIDE TABLE FOR A DIGITAL BROADCAST PROTOCOL AND METHOD OF BROADCASTING AND RECEIVING BROADCAST SIGNALS USING THE TABLE

This application claims the benefit of Korean Patent Application No. 1999-45327, filed on Oct. 19, 1999, which is hereby incorporated by reference for all purposes as if fully set forth herein.

BACKGROUND OF THE INVENTION

1. Field of the Invention

The present invention relates to a master guide table for a digital broadcast protocol and a method of broadcasting using the table.

2. Discussion of the Related Art

The Advanced Telephone System Committee (ATSC) has defined a program and system information protocol (PSIP) as a standard for digital television broadcast. In the program and system information protocol (PSIP), the Electronic Program Guide (EPG) and System Information (SI) are defined as one. Namely, the program and system information protocol (PSIP) is the ATSC standard for terrestrial and cable digital broadcast and is defined to provide various information about programs by parsing encoded messages using Moving Picture Experts Group standard ISO/IEC 13818-1 System (MPEG-2) (ATSC Document A/65, 23 Dec. 1997). "*Program and System Information Protocol For Terrestrial Broadcast and Cable,*" ATSC Document A/65, 23 Dec. 1997 is hereby incorporated by reference for all purposes as if fully set forth herein.

That is, the program and system information protocol is used to transmit or receive audio/video data according to the MPEG-2 video format and AC-3 audio format. Also, the program and system information protocol includes a plurality of tables for transmitting channel information corresponding to each broadcast station, and program information for each channel.

The program and system information protocol can support a main function of selecting a desired channel and for providing audio/video data of the selected channel, and a supplementary function of performing a broadcast guidance service such as an Electronic Program Guide (EPG) for the broadcast programs.

The channel information for selecting the desired channel and packet identification number (PID) for receiving the audio/video data is transmitted to the receiving party through a virtual channel table (VCT), while the information for the Electronic Program Guide (EPG) for the broadcast programs of each channel is transmitted to the receiving party through one or more event information tables (EIT). Further, the program and system information protocol (PSIP) includes a System Time Table (STT) for providing time information, a Rating Region Table (RRT) for forwarding information of geographical region and a corresponding organization and the like to provide a program rating level, an Extended Text Table (ETT) providing an additional description for the channel and broadcast program, and a Master Guide Table (MGT) for managing a version and program identifier for the tables mentioned above.

The tables are transmitted by a data structure called a "section." That is to say, each table has a section as a basic unit, and a table may be constructed by combining one or more sections.

Each event information table (EIT) has event information for one virtual channel i.e., title, starting time, ending time, caption, and the like. Here, one event generally means a typical television program. Each event information table can be expressed in a general format as EIT-k (k: 0, 1, ..., 127), and a maximum number if 128 event information tables can be created and transmitted. Each event information table EIT-k may have multiple instances, each of which contains information for one virtual channel. Specifically, the program and system information protocol PSIP may have at least 4 and a maximum of 128 event information tables EITs, and each event information table EIT provides event information for a specific time zone.

FIG. 1 is a diagram illustrating a bit stream syntax of a general master guide table (MGT). The master guide table (MGT) is transmitted in a single section format as a table, listing version number, length, and program identifier (PID) for all of the tables of the program and system information protocol (PSIP), except the System Time Table (STT).

With reference to FIG. 1, the master guide table (MGT) has a table identifier field "table_id" of "0xC7," and a section length field "section length" which represents the section length. A version number field "version_number" represents a version value of the master guide table (MGT), the version value is increased by 1 module 32 when the contents of the master guide table (MGT) are changed.

Meanwhile, a section number field "section-number" represents a corresponding section number, a last section number field "last_section_number" represents a last section number of the master guide table (MGT), and the two fields each have a fixed value of "0x00", since the MGT is always one section long. A table definition field "tables_defined" defines a number of tables (0-65535) which will appear in a "for_loop" statement afterward.

A table type field "table_type" in the "for_loop" statement represents the type of table. For example, a value of each table information type field "table_type" for the event information tables EIT0-EIT127 is 0x0100-0x017F. A table type program identifier field "table_type_PID" defines the program identifier (PID) for the table type field "table_type", and a table type version number field "table_type_version-_number" designates the version number defined in each table type field "table_type." For instance, a next event information table (EIT) has a value increased by 1 with respect to the value of the present event information table (EIT).

A descriptors length field "descriptors_length" represents the whole length in bytes for representing a descriptor of the master guide table (MGT). An error correction field, CRC_32, represents a 32 bit cyclical redundancy check (CRC) value for error correction.

Here, the program identifier (PID) of the general format EIT-k event information table must have an equivalent value as specified as the master guide table (MGT), and has to define a unique value in the table type program identifier field "table_type PID" contained in the master guide table (MGT).

For instance, a broadcast station can transmit broadcast information from the present time through the next 16 days to the digital television receiver by means of the event information tables EIT-0, EIT-1, EIT-2, ..., EIT-127. That is, an event information table (EIT) has contents for events corresponding to a period of 3 hours, and a total of 128 event information tables (EITs) can be transmitted in the field. Here, the event information table EIT-0 means a table for an event of the present time, and is shifted every 3 hours (i.e., 0:00, 03:00, 06:00, etc.).

At this time, if an electronic program guide EPG service is to be performed, the digital television receiver has to store the contents of the event information tables by parsing the event information tables. To achieve this, the digital television receiver constructs a database for performing the electronic program guide (EPG) service by gathering the event information tables (EITs) received from the broadcast station.

FIG. 2 is a diagram illustrating a schedule information table for programs broadcasting over four virtual channels of one physical channel.

In FIG. 2, 1-A, 1-B . . . , 1-E designate program titles which will be broadcast in a channel 51-1, and 2-A, . . . , 4-F designate other program titles for the virtual channels.

In the figure, the lines with the dot at the end designate the current time zone, while the lines with the arrows designate the absolute time at which the general format EIT-k (k=0-127) event information table is shifted in FIG. 2, respectively.

According to the ATSC standard within a 24-hour day, there are 8 absolute times for shifting the contents of the event information table, i.e., 0:00, 3:00, 6:00, 9:00, 12:00, 15:00, 18:00, 21:00.

Meanwhile, the present time zones in FIG. 2 are divided into 5 zones based on the absolute time for shifting the general format EIT-k of the event information table. At this stage, the contents of the general format EIT-k event information table are shifted to the other general format EIT-(k−1) event information table according to each time zone. Here, k is a positive integer of between 0 and 127.

For instance, if the data in the event information table EIT-0 based on the absolute time for shifting the contents of the event information table EIT is expired because the data belongs to a past program, the contents of the event information table EIT-1 are shifted to the event information table EIT-0.

As described, when the present time zone is the absolute time for shifting event information table EIT-k, the digital television receiver has to receive the entire event information tables (EITs) all over again, in order to perform the service of the Electronic Program Guide EPG.

That is, the version number of the master guide table MGT is changed whenever the contents of the tables defined in the table type of the "for_loop" statement are changed. For example, if the contents of the event information table EIT-k are changed, the version number of the master guide table MGT is changed. Also, if the contents of the event information tables EIT, i.e. the program contents, are shifted without change, the version number of the master guide table MGT is also changed.

The television receiver performs an update operation with the contents of the event information table EIT-k by receiving the event information table EIT-k again and receiving the contents of the database again when the version number of the master guide table MGT is changed, while the table type program identifier field "table_type_PID" defines the event information table EIT-k.

This description clearly means that the database should be updated perfunctorily at every absolute time shifting of the event information table.

Accordingly, there is a drawback in the related art in that unnecessary time for updating the database is consumed, even if the contents of the database for the program constructed in a previous time zone are not changed. This time consumption places a heavier burden on the digital television receiver or the cable broadcast receiver, which operates as the receiving party.

Further, viewers have to wait for a long time with patience to receive the service of the Electronic Program Guide (EPG).

SUMMARY OF THE INVENTION

Accordingly, the present invention is directed to a master guide table that substantially obviates one or more of the problems due to limitations and disadvantages of the related art.

An object of the present invention is to provide master guide table for a digital broadcast protocol which can classify whether contents of an event information table are actually changed, or instead are merely time shifted.

Another object of the present invention is to provide an efficient method of broadcasting using a master guide table to identify whether contents of an event information table are actually changed, or instead are merely time shifted.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve the above objects, there is provided a master guide table for a digital broadcast protocol, comprising identification information for classifying whether contents of an event information table in a bit stream syntax are merely time shifted, or actually changed.

Here, it is desired that at least one bit is allocated to indicate the identification information among the reserved fields of the master guide table (MGT).

To achieve the above objects, there is provided a method of broadcasting using a master guide table for a digital broadcast protocol. According to the method, a transmitting party prepares a master guide table (MGT) according to the digital broadcast protocol. The transmitting party transmits the master guide table to a receiving party, after including a identification information which can classify whether contents of an event information table (EIT) in a bit stream syntax are merely time shifted or actually changed. The receiving party receives the master guide table, including the identification information, and parses the identification information and the event information table. The receiver does not update the database with the parsed contents of the event information table when the event information table is merely shifted, while the receiver updates the database with the parsed contents of the event information table, when the event information table is actually changed.

Here, the transmitting step comprising the steps of: preparing at least one event information table based on the present time using event information in broadcasting when a predetermined time for shifting the event information table; allocating a value of the program identification (PID) and a version number of at least the event information table EIT-k (k is 0-127); indicating whether the contents of the event information table are merely shifted or actually changed using at least one bit among the reserved fields of the master guide table; and transmitting the master guide table (MGT), including the identification information, to the receiving party after multiplexing it with an audio/video transport bit streams.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 1 is a diagram illustrating a bit stream syntax of a general master guide table (MGT);

FIG. 3 is a diagram illustrating a bit stream syntax of a master guide table (MGT) according to a preferred embodiment of the present invention.

DETAILED DESCRIPTION OF THE PREFERRED EMBODIMENTS

Figure 2:
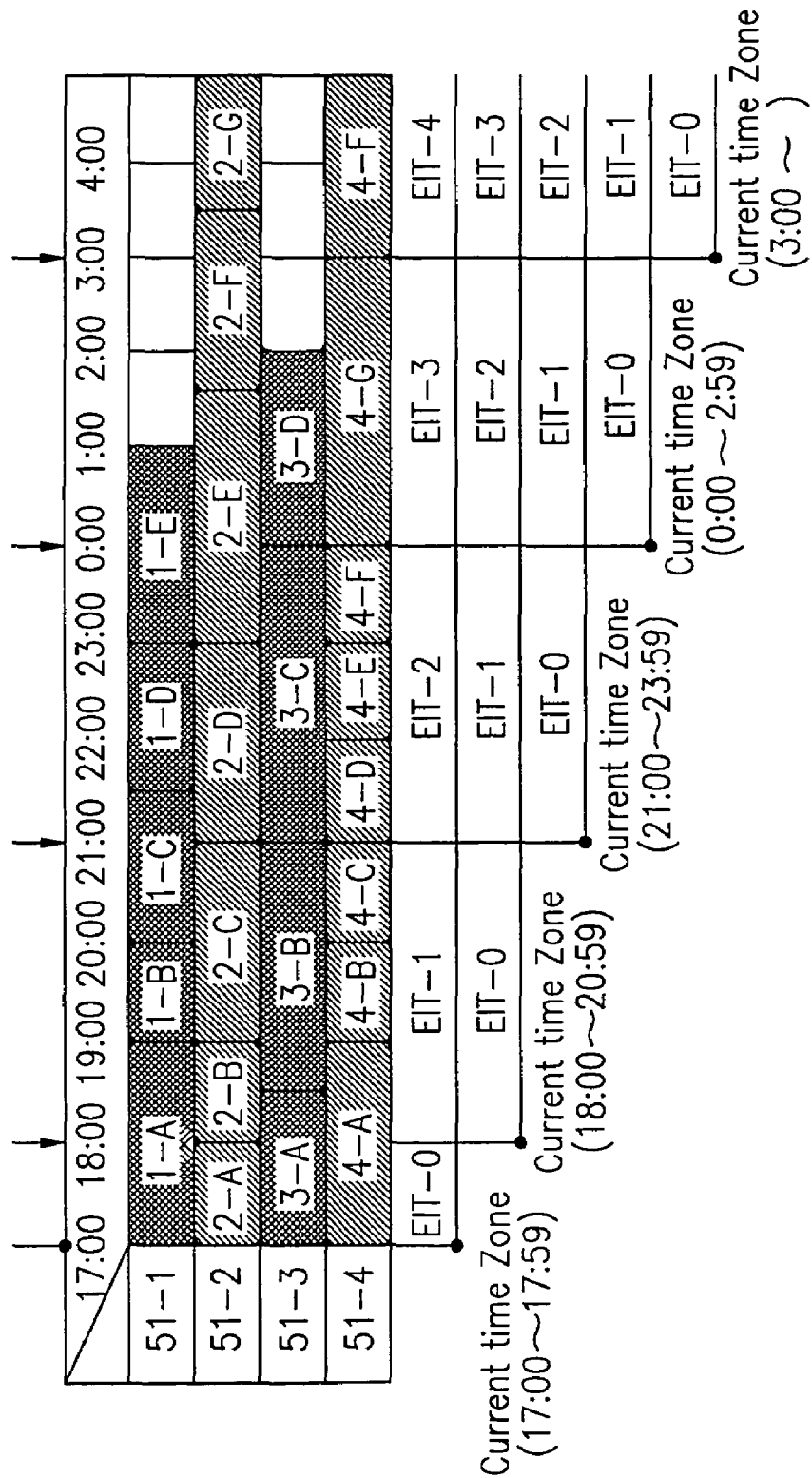
FIG. 2 is a diagram illustrating a schedule information table for programs broadcasting through four virtual channels of a physical channel.

Reference will now be made in detail to the preferred embodiment of the present invention, an example of which is illustrated in the accompanying drawings.

A preferred embodiment of the present invention will now be described with reference to the accompanying drawings. In the following description, the same drawing reference numerals are used for the same elements even in different drawings.

In the present invention, a transmitting party corrects a bit stream syntax of the master guide table to classify whether contents of an event information table (EIT) are changed or merely shifted, by parsing the master guide table.

In a preferred embodiment of the present invention, one or more reserved fields in the bit stream syntax of the master guide table (MGT) are used as identification information for indicating whether the event information table EIT-0 is merely shifted, or actually changed.

FIG. 3 is a diagram illustrating a bit stream syntax of a master guide table (MGT) according to a preferred embodiment of the present invention.

In FIG. 3, at least 1 bit out of 3 bits of a reserved field is allocated to indicate the identification information. The 1 bit is defined as a flag representing whether the event information table EIT is merely time shifted, or actually changed. In the preferred embodiment of the present invention, 1 bit of the reserved field between a table type program identifier field "table_type_PID" and a table type version number field "table_type_version_number" in a "for_loop" statement as shown in FIG. 3 is used as the flag representing whether the event information table EIT is merely time shifted or actually changed. For example, if the flag "EIT_shifted" is "1", it indicates a normal state wherein the contents of the event information table EIT are changed, while if the flag "EIT_shifted" is "0", it indicates that the contents of the event information table EIT are merely time shifted.

Table 1 represents an example as described above.

TABLE 1

| EIT_shifted | Indication |
| --- | --- |
| 0 | shifted EITs (from EIT-(k) to EIT-(k-1)) |
| 1 | don't care |

It is desirable that the contents as described above may be added to the ATSC standard A/65 document, as a requirement if necessary.

For instance, if an employee of a television broadcast station inputs the present time and broadcast information, an encoder of the program and system information protocol PSIP makes or prepares a System Time Table (STT) for the present time and receives event information i.e., an event title, an event starting and ending time, an event rating, and an event caption, etc. planned during a fixed time period (for example, a minimum of 12 hours and a maximum of 16 days) for each channel from the television broadcast station. The television broadcast station makes or prepares the event information tables (EITs) based on the current time using the event information which is provided. For instance, if information for 16 days is input, the television broadcast station makes 128 event information tables EIT0~EIT127, while if the information of only a single day is input, the television broadcast station makes 8 event information tables EIT0~EIT7. And, the television broadcast station forms the master guide table (MGT) by allocating a value for the program identifier PID and the version number of each event information table EIT-k. The master guide table (MGT) is multiplexed with an audio/video transport bit stream and transmitted to the receiving party.

Meanwhile, the encoder of the program and system information protocol (PSIP) makes at least one event information table (EIT) based on the current information using the event information which is being broadcast at the present time when a shift timer (not shown) for the event information table (EIT) indicates a predetermined shifting time, in the case that the event information table is merely shifted, and indicates simultaneously by means of the shift field "EIT_shifted" of the event information table of the master guide table (MGT) that the event information table (EIT) is merely shifted.

That is to say, if the time for shifting the event information table EIT occurs, the television broadcast station makes at least one event information tables based on the current time using the event information which is being broadcast at present. For instance, if event information for a period of 16 days is input, the television broadcast station makes 128 event information tables EIT0-EIT127, while if the events of only a single day are input, the television broadcast station makes 8 event information tables EIT0-EIT7. Next, the television broadcast station makes the master guide table (MGT) in such a manner as to increase a previous state of a value of the program identification PID and version numbers of the each event information table EIT-k.

At this time, the television broadcast station sets the event information shift field "EIT_shifted" of the master guide table (MGT) to "0", and transmits the master guide table (MGT) to the receiving party after multiplexing with the audio/video transport stream.

Accordingly, the digital television receiver easily determines that the contents of the event information table EIT-k is changed by merely a shifting operation in the caste that the event information shift field EIT_shifted is reset as "0" on parsing the master guide table (MGT). Thus, it is clearly known that the contents of the entire event information table (EIT), i.e., the contents of each event information table EIT-k in which the contents of the program are not changed, is shifted one by one by the shifting operation.

In this case, the receiver does not update the database constructed to perform the service of Electronic Program Guide (EPG).

Accordingly, the digital television receiver receives these tables and decreases the load for updating the database which is previously constructed, when the broadcast station again transmits the event information tables EIT at a reference time, for example every 3 hours.

On the other hand, if the event information field EIT_shifted is set as "1", the conventional operation is performed. For instance, the event information table shift field EIT_shifted represents "1" when the version of the master guide table MGT which is parsed is changed and the event information table EIT-k defined as a sub-table in the master guide table MGT is not shifted, the digital television receiver receives again and parses the corresponding event information table EIT-k and updates the database with the contents of the parsed event information table EIT-k since the contents of the program are actually changed.

Meanwhile, if the contents of the event information table EIT are shifted, the event information table shift field EIT_shifted is set as "1", and other fields may be reset as "0."

In the preferred embodiment of the present invention, there is disclosed the case of the digital television broadcast, but the invention is available to apply to other system to allow the service of the Electronic Program Guide EPG, such as the cable broadcast, the satellite broadcast, the terrestrial digital broadcast, etc.

According to the present invention as described above, the transmitting party includes and transmits the identification information for classifying whether the contents of the event information table EIT which is a sub table of the master guide table (MGT) are changed or merely shifted in the bit stream syntax of corresponding master guide table. Accordingly, if the event information table is merely shifted, the database previously constructed is not updated and thereby saving wasted time caused by updating the database unnecessary.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A receiver for storing information associated with a digital broadcast protocol that comprises:
   the receiver configured to receive a version number for a presently transmitted event information table in a transport stream of the digital broadcast that is different from a version number for a previously transmitted event information table, wherein the presently transmitted event information table and the previously transmitted event table have the same packet identification number (PID); and
   the receiver configured to receive a second identifier for the presently transmitted event information table, the second identifier being distinct in value from the version number of the presently transmitted event information table and having one of two values, wherein the second identifier having a first value indicates to the receiver that contents of an event information table in a bit stream syntax are shifted and the second identifier having a second value indicates to the receiver that contents of an event information in a bit stream are changed.

2. The receiver of claim 1, wherein the receiver is configured to receive a version and packet identification number (PID) for each table, including the event information table, defined in a program and system information protocol (PSIP) for a digital broadcast.

3. The receiver of claim 1, wherein the receiver is configured to receive the second identifier stored in a reserved field that includes at least one bit that indicates whether the contents of the event information table are shifted or changed.

4. The receiver of claim 3, wherein the receiver is configured to receive the second identifier stored in the reserved field in a master guide table that is situated in a "for_loop" statement in the bit stream syntax.

5. The receiver of claim 3, wherein when the receiver receives a bit value of "0" the event information table is shifted, and when the receiver receives a bit value of "1" the event information table is changed.

6. A method of broadcasting using a master guide table for a digital broadcast protocol, the method comprising:
   (a) preparing, at a transmitting side, a present event information table comprising contents pertaining to a broadcast event;
   (b) preparing, at the transmitting side, a master guide table for the digital broadcast protocol, the master guide table including a version number for the present event information table that is different from a version number for a previously transmitted event information table, wherein the present event information table and the previously transmitted event information table have the same packet identification number (PID), and a second identifier of the present event information table, distinct in value from the version number of the present event information table and having one of two values, the second identifier comprising a first value which indicates whether the contents of the present event information table in a bit stream syntax are shifted or a second value which indicates whether the contents of the present event information table in a bit stream syntax are changed;
   (c) transmitting the master guide table and the present event information table to a receiving side;
   (c) receiving, at the receiving side, the master guide table and the present event information table; and parsing the second identifier and the present event information table; and
   (d) selectively updating a database having parsed contents of the previous event information table with the parsed contents of the present event information table in accordance with the parsed second identifier.

7. The method of claim 6, wherein the selective updating step (d) does not update the database with the parsed contents of the present event information table when the second identifier has the first value indicating that the present event information table is shifted in time, while updating the database with the parsed contents of the present event information table when the second identifier has the second value indicating that the present event information table is changed.

8. The method of claim 6, wherein the the second identifier is stored in at least one bit of a reserved field of the master guide table.

9. The method of claim 8, wherein the bit has a value of "0" when the contents of the present event information table are shifted, and has a value of "1" when the contents of the present event information table are changed.

10. The method of claim 6, wherein the transmitting step (c) comprises:
   preparing at least one event information table based on the present time using event information;
   allocating a program identification PID value and a version number for each event information table and including the second identifier in the bit stream of the master guide table (MGT); and transmitting the master guide table to the receiving party after multiplexing the master guide table with an audio transport bit stream and a video transport bit stream.

11. The method of claim 10, wherein the second identifier is stored in a reserved field of the master guide table.

12. The method of claim 6, wherein the event information table is prepared for each channel, each table comprising an event title, an event start time and an event end time for the event, and an event caption.

13. In a digital television receiver, a method of providing an electronic program guide, comprising:

receiving a digital broadcast signal comprising a master guide table and an event information table; the master guide table comprising a version number for a present event information table transmitted in a transport stream of the digital broadcast that is different from a version number for a previously transmitted event information table, wherein the present event information table and the previously transmitted event information table have the same packet identification number (PID) and a second identifier for the present event information table, distinct in value from the version number for the present event information table and having one of two values, wherein a first value of the second identifier indicates whether the contents of the event information table in a bit stream syntax are shifted and a second value of the second identifier indicates whether the contents of the event information table in a bit stream syntax are changed;

parsing the master guide table;

retrieving the second identifier from the parsed master guide table indicating whether contents of the event information table are actually changed or only shifted; and in accordance with the parsed second identifier, parsing the event information table and selectively updating a database for the electronic program guide with the parsed contents of the event information.

14. The method of claim 13, wherein the database is not updated with the parsed contents of the event information table when the parsed second identifier indicates that the present event information table is shifted in time, while the database is updated with the parsed contents of the event information table when the parsed second identifier indicates that the event information table is changed.

15. The method of claim 13, wherein retrieving the second identifier comprises reading a value of a bit assigned in a reserved field in the master guide table.

16. The method of claim 13, wherein the bit has a value of "0" when the contents of the present event information table are shifted, and has a value of "1" when the contents of the present event information table are changed.

* * * * *